United States Patent
Lenz

(10) Patent No.: US 9,470,330 B2
(45) Date of Patent: Oct. 18, 2016

(54) ACTUATING DEVICE AND METHOD FOR DISPLACING THE ACTUATING DEVICE

(71) Applicant: OneSubsea IP UK Limited, London (GB)

(72) Inventor: Norbert Lenz, Celle-Deutschland (DE)

(73) Assignee: OneSubsea IP UK Limited, London, England (GB)

( * ) Notice: Subject to any disclaimer, the term of this patent is extended or adjusted under 35 U.S.C. 154(b) by 0 days.

(21) Appl. No.: 14/621,285

(22) Filed: Feb. 12, 2015

(65) Prior Publication Data

US 2015/0152971 A1    Jun. 4, 2015

Related U.S. Application Data

(62) Division of application No. 13/383,813, filed as application No. PCT/EP2009/005261 on Jul. 20, 2009, now Pat. No. 8,978,687.

(51) Int. Cl.
   *F16K 3/02*   (2006.01)
   *F16K 31/04*  (2006.01)
   *F16K 3/24*   (2006.01)
   *F16K 31/50*  (2006.01)

(52) U.S. Cl.
   CPC .............. *F16K 31/04* (2013.01); *F16K 3/02* (2013.01); *F16K 3/24* (2013.01); *F16K 31/047* (2013.01); *F16K 31/504* (2013.01); *Y10T 137/0318* (2015.04); *Y10T 137/2036* (2015.04)

(58) Field of Classification Search
   CPC ...... F16K 31/02; F16K 31/04; F16K 31/504; F16K 31/53; F16K 31/0655; F16K 3/00; F16K 3/02; B21B 33/0355; Y10T 137/2036; E21B 33/0355
   See application file for complete search history.

(56) References Cited

U.S. PATENT DOCUMENTS 88,599 A * 4/1869 Allen ................. F16K 3/12
                                                    251/326
1,192,141 A * 7/1916 White ................ E02B 7/36
                                                    137/637

(Continued)

FOREIGN PATENT DOCUMENTS

GB    2425585 A1   11/2006
WO    2008125136 A1   10/2008

OTHER PUBLICATIONS

International Search Report Issued in Application No. PCT/EP2009/005261, Dated Apr. 26, 2010 (3 Pages).

*Primary Examiner* — Matthew W Jellett
(74) *Attorney, Agent, or Firm* — Chamberlain Hrdlicka

(57) ABSTRACT

An actuating device or displacing a control device, such as a valve, gate valve or other control mechanism, in particular for use in oil or gas production systems, comprises a motor-gear unit (21) and a thread drive (22) which is operable by said motor-gear unit (21) and which comprises at least a threaded spindle (23) and a screw nut (24). The threaded spindle (23) is displaceable in an essentially axial direction so as to displace the control device (2) between a use position (7) and a non-use position (8, 9, 19, 20). To ensure a safe displacement into the non-use position in a simple way and independently of the pressure conditions prevailing between conveying medium and inner medium, the threaded spindle (23) is substantially axially displaceable beyond the use position (7) into a second non-use position (9). The invention also refers to a corresponding method for displacing the actuating device.

11 Claims, 4 Drawing Sheets

(56) References Cited

U.S. PATENT DOCUMENTS

| | | |
|---|---|---|
| 3,677,001 A | 7/1972 | Childers et al. |
| 3,933,338 A | 1/1976 | Herd et al. |
| 4,193,574 A * | 3/1980 | Barnes .................. E21B 33/062 |
| | | 251/1.3 |
| 4,499,919 A * | 2/1985 | Forester .................. E21B 34/02 |
| | | 137/246.22 |
| 5,094,270 A * | 3/1992 | Reimert .................. F16K 3/029 |
| | | 137/614.11 |
| 5,332,002 A * | 7/1994 | Reimert .................. F16K 3/029 |
| | | 137/614.11 |
| 6,899,171 B2 | 5/2005 | Biester et al. |
| 8,051,872 B2 | 11/2011 | Lenz |
| 8,274,245 B2 | 9/2012 | Biester et al. |
| 2003/0116733 A1* | 6/2003 | Hoang .................... E21B 21/10 |
| | | 251/62 |

\* cited by examiner

ACTUATING DEVICE AND METHOD FOR DISPLACING THE ACTUATING DEVICE

BACKGROUND

The present invention relates to an actuating device for displacing a control device. Such a control device is e.g. a valve, a gate valve, a so-called blow-out preventer or some other control mechanism used in the field of oil and natural gas production, in particular in the maritime sphere. Such a control device is provided with a suitable actuating element which is adapted to be displaced by the actuating device so as to displace e.g. a valve as a control device into a use position and a non-use position.

The actuating device comprises at least a motor-gear unit and a thread drive, in particular roll-type thread drive, which is operable by said motor-gear unit and which comprises a threaded spindle and a screw nut. The screw nut is normally rotatable, but supported in an axially non-displaceable way in the actuating device, whereas by rotation of the screw nut by means of the motor-gear unit the threaded spindle is adapted to be displaced for displacing the control device between use position and non-use position.

Moreover, the actuating device may comprise a position holding means for holding the position attained by the threaded spindle. This position holding means especially prevents the threaded spindle from returning automatically from the attained position.

Such an actuating device is described in WO 2008/125136 A1 and is also called electrical and springless actuating device, the device showing a very compact design with only a small number of components. The actuating device is inexpensive and requires only small forces for displacing the corresponding control device.

With this prior-art actuating device it has turned out that no difficulties will arise as long as there is an adequate electrical power supply that guarantees that the actuating device is operable for adjusting the control device.

However, in the event of external power outage it has been found that under specific pressure conditions between the conveying medium, the conveyance of which is controlled by the control device, and an inner medium in the actuating device no automatic closing or occupying of the non-use position, respectively, is possible in the control device. This holds particularly true whenever the pressure of the conveying medium is smaller than the pressure of the inner medium. Since the actuating device with the associated control device is particularly arranged under water, the pressure of the inner medium is normally defined by the ambient pressure of the actuating device that is determined by the water depth.

In the known actuating device and under specific pressure conditions, this might have the consequence that in the absence of an electrical power supply no automatic displacement into the non-use position is possible.

It is the object of the present invention to ensure a safe displacement into the non-use position in a simple way independently of the pressure conditions prevailing between conveying medium and inner medium.

In the prior-art actuating device, control device and actuating device are automatically displaced into the non-use position in the absence of electrical power supply, by way of corresponding pressure application by the conveying medium towards non-use position. This pressure application is maintained as long as the pressure of the conveying medium is greater than the pressure of the inner medium.

According to the invention, to achieve the above-mentioned object, control device and actuating device in the absence of electrical power supply are additionally displaced towards a second non-use position if a pressure in the conveying medium is smaller than a pressure of the inner medium acting in the actuating device on the piston. The piston is here displaced beyond the use position into a second non-use position.

Corresponding pressure conditions can also prevail particularly when actuating device and control device are used for gas production. With a corresponding gas well, the well pressure or the pressure of the conveying medium, respectively, is lower than the corresponding pressure of the inner medium.

Therefore, according to the invention, irrespective of the prevailing pressure condition also in case of electrical power outage the actuating device with the associated control device can be safely and easily displaced into the non-use position all the time, whereby the associated control device is displaced into a corresponding closed position. It is only in the use position that the control device is in an open position.

Accordingly the object is achieved with the device in that the piston of the actuating device and the control device connected thereto are displaceable beyond the use position into a second non-use position by corresponding pressure application.

It can be regarded as advantageous in the present context when the corresponding pressure application takes place both towards first and second non-use position directly via the control device and that said device is displaced accordingly together with the actuating device in motion communication therewith into the corresponding non-use position.

To achieve a controlled displacement towards first and second non-use position with a corresponding closing, i.e. during displacement between use position and non-use position, the displacement may take place in case of electrical power supply against the resistance particularly of the motor-gear unit of the actuating device.

Furthermore, it is possible that ambient pressure and pressure of the inner medium of the actuating device are both identical, and this can e.g. be accomplished by means of a pressure compensator. At least one such pressure compensator can be assigned to the actuating device and particularly to the interior thereof.

As has already been stated at the outset, in the present invention a safe displacement into the non-use position is achieved both at a pressure of the conveying medium greater than a pressure of the inner medium and at a pressure of the conveying medium smaller than the pressure of the inner medium.

To guarantee a reliable displacement into non-use position at identical pressure of conveying medium and inner medium, a corresponding displacement into non-use position can be achieved by means of an emergency device. Such an emergency device is e.g. an emergency power supply in the form of a battery, an accumulator, or the like, or also a mechanical displacement particularly from outside of the actuating device. Such a mechanical displacement can e.g. be performed by a remotely operated vehicle, i.e. by a so-called ROV. In this connection it should be noted that with a just balanced pressure only small forces are needed for the displacement between use position and non-use position, which forces must e.g. just overcome the friction forces. This means that only a small power is needed for displacement between use position and non-use position.

Upon displacement from use position into non-use position in the absence of electrical power supply the motor-gear unit of the actuating device can advantageously be operated as a generator, whereby a displacement into non-use position is also decelerated.

To ensure particularly a controlled displacement between use position and non-use position in case of adequate electrical supply, a position sensor may at least be assigned to the motor-gear unit. Such position sensor is for example disclosed in EP 1 756 528. The position sensor comprises a linear moving body and a stationery element detecting the movement of the body.

In order to optionally mount the actuating device in a simple way and also to be able to replace parts thereof, the actuating device can comprise at least a drive module, an adapter module and a connection module. Furthermore, the drive module can be subdivided into motor module and gear module.

The connection module can particularly serve the direct connection to the control device, said control device being e.g. particularly detachably fastened from the outside to the control device.

To be able to guide a corresponding valve slide of a valve as the control device or another displaceable part of the control device, the connection module may comprise a guide bore for such a valve slide of the control device, through which guide bore the valve slide is guided up into the adapter module. The adapter module is here arranged between connection module and drive module. The individual modules are inter-connectable by means of quick-action locks, or the like.

In a further embodiment the guide bore can assume an additional function in that it comprises an end stop for a slide head of the valve slide. Said stop may e.g. serve the fixation of the first non-use position in that the slide head substantially rests on the end stop in this first non-use position.

An advantageous possibility of arranging the pressure compensator may be seen in the feature that said compensator is assigned to the adapter module.

The object underlying the present invention can further be achieved through an arrangement of two actuating devices, wherein first and second actuating devices are arranged one after the other relatively in flow direction of the conveying medium and show opposite displacement directions between use and corresponding non-use position. This means that the first actuating device with accompanying control device is e.g. displaced into non-use position at a pressure of the conveying medium greater than the pressure of the inner medium of the first actuating device, whereas the second actuating device with accompanying device is displaced at a pressure of the conveying medium smaller than the pressure of the inner medium of the second actuating device. It is thereby also ensured that in the absence of electrical power supply a non-use position is present at least in the case of a control device assigned to the actuating devices arranged one after the other.

To be more specific, the corresponding pistons of the actuating devices are displaceable in opposite directions for displacing the associated control device between use position and non-use position.

The displacement at least in case of an adequate power supply may take place in a sensor-controlled way in conformity with the previously indicated embodiment.

Advantageous embodiments of the present invention shall now be explained in more detail with reference to the figures attached in the drawings.

Figure 1:
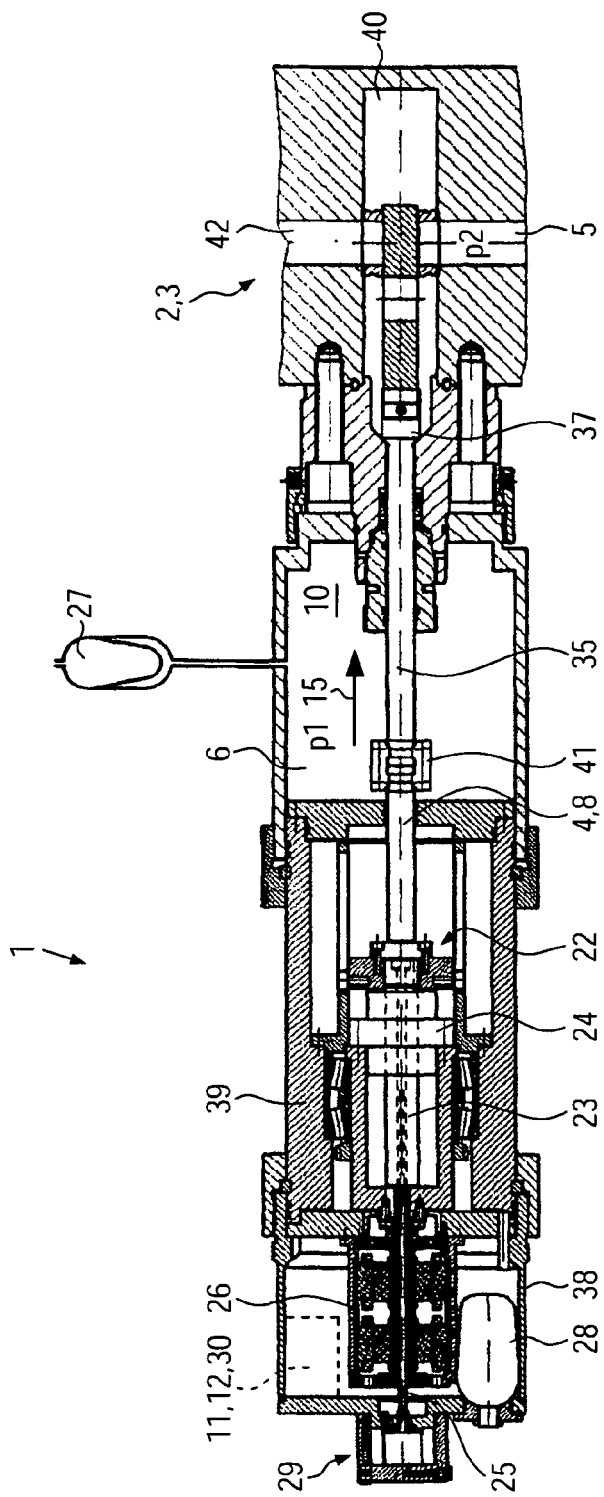
FIG. 1 is a longitudinal section through an actuating device according to the present invention in a first non-use position.

FIG. 1 shows a longitudinal section through a first embodiment of an actuating device 1 which is laterally flanged onto a control device 2 in the form of a gate valve 3. Such a gate valve serves to control the flow 35 of e.g. crude oil through a conveying line 42. The valve comprises a valve slide 35.

Figure 2:
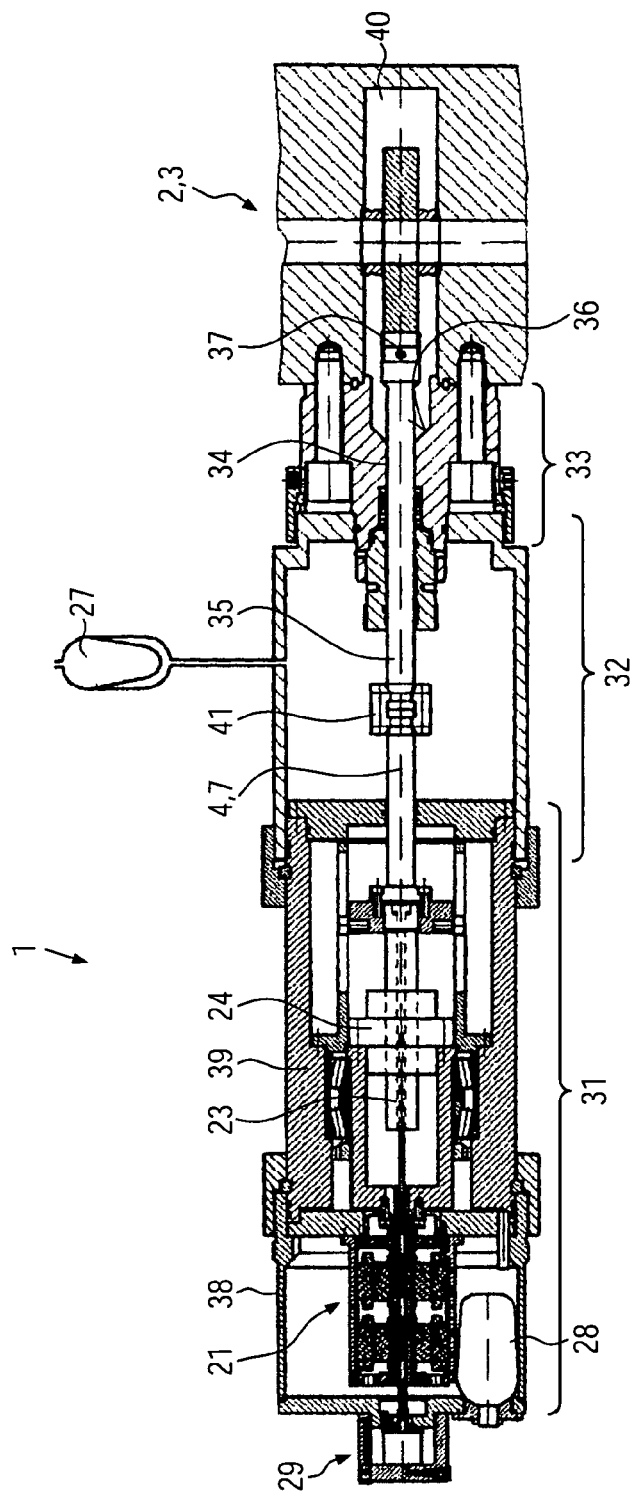
FIG. 2 is a longitudinal section by analogy with FIG. 1 through the actuating device according to the invention in use position.

The valve slide 35 ends in an inner chamber 10 filled with hydraulic fluid. A compensator 27 with hydraulic fluid is assigned to the inner chamber. The valve slide 35 is connected in displacement direction 15 via a coupling element 41 to the actuating device 1 according to the invention. Said device comprises a number of modules 31, 32 and 33 as shown in FIG. 2.

In the module 33 directly next to the control device 2, i.e. the connection module, a guide bore 34 is formed, through which the valve slide 35 is guided up into the neighboring module 32, i.e. the adapter module. In said adapter module the valve slide 35 is connected via the coupling element 41 to the piston 4. Said piston is connected in the next neighboring module 31, the drive module, to a threaded spindle 23 of a thread drive 22. The drive module 31 is subdivided into a motor module 38 and a gear module 39. In the gear module 39, the thread drive 22, which in addition to the threaded spindle 23 comprises a screw nut 24, and a gear are arranged. The screw nut 24 is rotatable, but axially undisplaceably supported in the gear module 39 and screwed with a connection sleeve at one end. Further details of the motor-gear unit 21 are particularly described in WO 2008/125136 A1.

The gear is configured between the thread drive 22 and the electric drive 26 in the motor module 38 as a so-called "harmonic drive". As a rule, such a harmonic drive comprises three members. A cylindrically deformable steel bushing with external teeth, which is non-rotatably connected via a hollow shaft to the spindle nut, and a ring element with internal teeth, which is in engagement with the cylindrical steel bushing at least with some teeth. The cylindrical steel bushing is in contact with an elliptical disk or a wave generator on its inner periphery. The wave generator is non-rotatably arranged on a motor shaft 25. Said motor shaft is rotatable by an electric drive 26, with the drive being optionally formed e.g. by two individual electric motors.

A pressure compensator 28 is arranged next to the electric drive. Said compensator is used for pressure compensation between the normally oil-filled actuating device 1 and the surroundings, i.e. water. The magnitudes compensated are the hydrostatic pressure (water depth) as well as temperature and/or volume variations. In the compensator, sea water is on one side, and oil from the actuating device on the other side. The compensator is open towards the sea water with its corresponding side.

A position sensor 29 is assigned to the motor shaft 25 and the electric drive 26, respectively. Said sensor serves to determine the position of the motor shaft and thus of the threaded spindle 23 so as to displace it in a controlled way between its use position 7 and a first and a second non-use position 8, 9. The position sensor is able to sample e.g. the interior of the threaded spindle magnetically, electrically or in some other way, and to determine, through this sampling, the relative position of the threaded spindle to the position sensor 29.

Compensator 27, which is assigned to the interior 10 of the adapter module 32, operates by analogy with compensator 28.

The actuating device is detachably secured from the outside by means of the connection module 33 to the corresponding control device 2. Said device is here shown as a gate valve, but other control devices are also possible. Such devices are e.g. a gate valve with pressure compensation, a choke, a blow-out preventer or other control mechanisms used in the field of natural gas and crude oil production, in particular on the sea bottom or at least below sea level. The actuating device according to the invention, however, can also be used in corresponding non-maritime devices.

In FIG. 1, the valve slide 35, see also the corresponding positions of the piston 4 and the threaded spindle 23, respectively, is arranged in the first non-use position 8. In this non-use position 8 a conveying medium 5 in a corresponding conveying line 42 is prevented from flowing therethrough and the corresponding valve is in closed position. The valve slide is displaceable inside a cross bore 40 in valve 3 between the illustrated first non-use position 8 and, see e.g. FIG. 2, the use position 7. The corresponding displacement is controllable by the position sensor 29. A slide head 37 of the valve slide rests on an end stop 36 of a guide bore 34.

With a corresponding electronic supply of the actuating device 1 there is each time a displacement between use position 7 and first non-use position 8 by actuation of the electric drive 26. Said drive rotates the motor shaft 25 and said shaft, in turn, the screw nut 24, whereby the threaded spindle 23 is displaceable by rotation of the screw nut 24 in displacement direction 15, see FIG. 1, i.e. in axial direction. When the threaded spindle 23 is displaced, the piston 4 and the valve slide 35 connected thereto via the coupling element 41 are moved by analogy.

In the absence of a corresponding electrical power supply for the actuating device 1, the valve slide 35 might not be returnable from the use position 7 into the first non-use position 8 so as to close the conveying line 42, see FIGS. 1 and 2. As long as pressure p2 in the conveying medium 5 is greater than a pressure p1 in the inner medium 6 in the interior 10 of the adapter module 32, the valve slide 35 can be displaced into the position according to FIG. 1 from the position according to FIG. 2 by the corresponding overpressure in the conveying medium even in the absence of an electrical power supply. With this displacement it is possible to operate the electric drive of the actuating device 1 as a generator so as to decelerate a corresponding closing speed of the valve slide.

Figure 3:
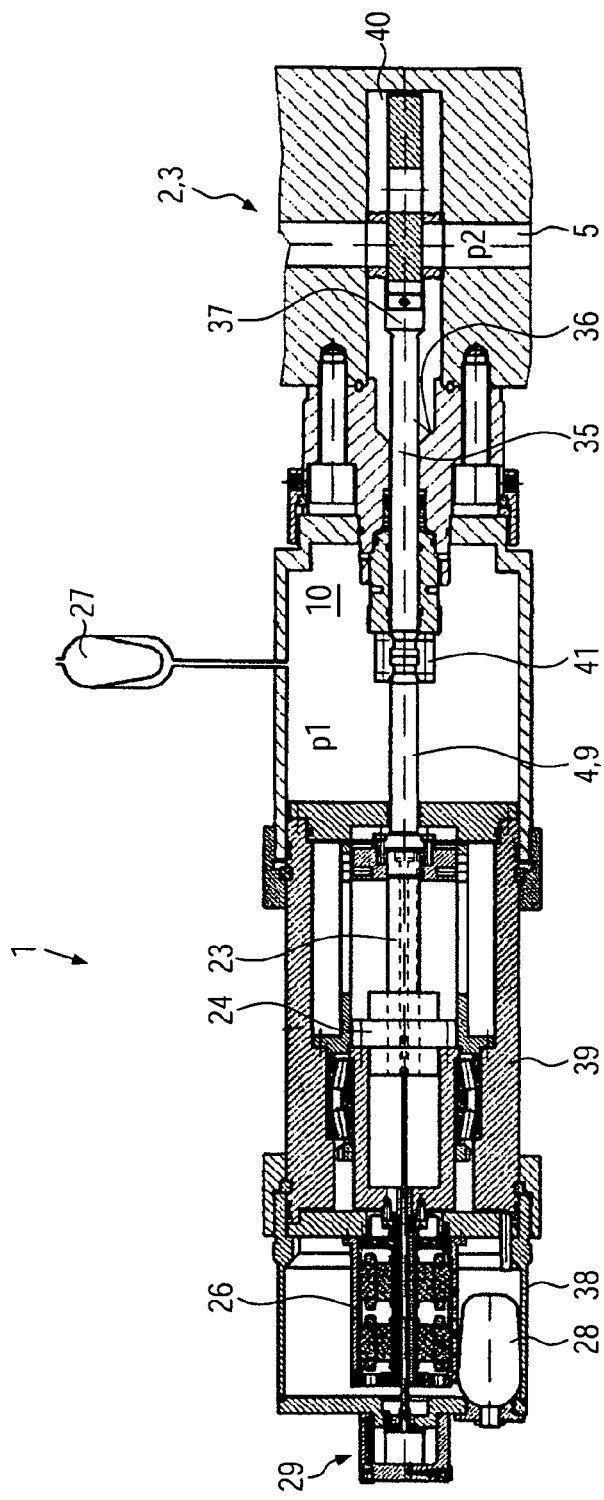
FIG. 3 is a section by analogy with FIG. 1 through an actuating device according to the invention in a second non-use position.

To be able to close the valve in a safe way in the absence of any electrical supply also under reverse pressure conditions, i.e. pressure p1>p2, the second non-use position 9 is provided, see FIG. 3, into which the piston 4 and also the valve slide 35 are shifted by the increased pressure p1 in the interior 10 of the adapter module 32 out of the use position according to FIG. 2. In this second non-use position 9 the conveying line 42 is also closed by the valve slide.

The electric drive 26 of the actuating device 1 can also be operated in this case as a generator, whereby a corresponding closing speed is decelerated.

According to the invention even in the absence of any electrical power supply to the actuating device, it is thereby ensured that the valve slide is reliably displaced into the respectively closed position of the valve, see first and second non-use position 8, 9.

Furthermore, it is possible that pressure p1 is substantially identical with pressure p2, so that in the absence of any electrical supply there is no displacement from the use position according to FIG. 2 into one of the non-use positions 8, 9 according to FIG. 2 or 3. In this case the actuating device 1 may comprise an emergency device 11, which is e.g. an emergency power supply 30 in the form of a battery 12 or an accumulator. Since with corresponding pressure compensation, i.e. p1 is substantially identical with p2, only small actuating forces are needed for displacing the valve slide, see corresponding friction forces, such an emergency power supply 30 is adequate for attaining one of the non-use positions 8, 9 with the help of the position sensor 29 and by means of the electric drive 9.

The corresponding emergency device 11 may also be a mechanical actuator, by which from the outside by means of a remotely operated vehicle, such as a ROV, e.g. the motor shaft is rotatable so as to displace the valve slide accordingly from the use position 7 into one of the non-use positions 8, 9.

According to the invention the actuating device 1 is composed of the above-mentioned number of various modules. This facilitates both the assembly of the actuating device and a corresponding repair in that only one corresponding module is replaced. The modules 31, 32, 33 and 38, 39 are detachably connected to one another by means of screws and union nuts, or the like.

It should here additionally be noted that in all figures identical parts are provided with identical reference numerals and are described in more detail in part only in connection with one figure.

As for the actuating device according to the invention, it should further be noted that, when the threaded spindle is displaced, a volute spring or loop spring is definitely not compressed in said device or has to be released for instance for returning the threaded spindle into non-use position. Instead of this, the actuating device can transmit both traction forces and pressure forces to the corresponding control device. Furthermore, it is possible, see WO 2008/125136 A1, to apply a holding torque to the threaded spindle in its corresponding attained position. This holding torque can be generated e.g. by a suitable holding current of the electric drive. The holding torque may here also be generated by a stepping motor or by a motor shaft blocking means. In the two latter cases, the electric drive of the actuating device will then be currentless, i.e. powerless, upon generation of the holding torque.

Such a holding torque prevents an automatic displacement of the threaded spindle out of the attained position.

Figure 4:
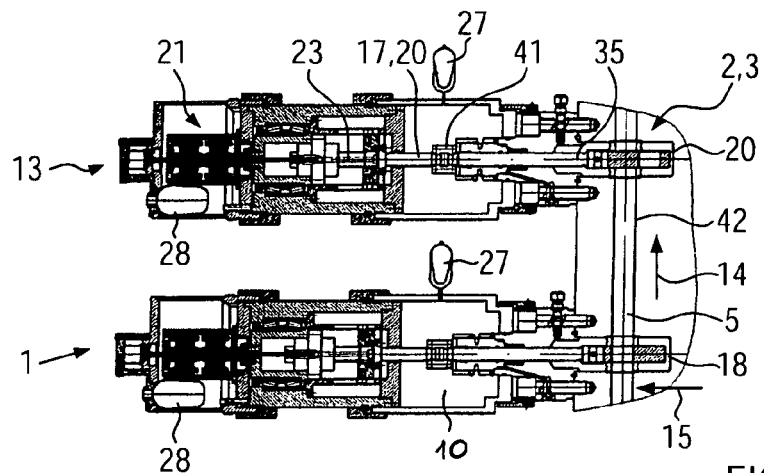
FIG. 4 shows a further embodiment of the invention with two actuating devices arranged one after the other, of which one is in non-use position.
Figure 5:
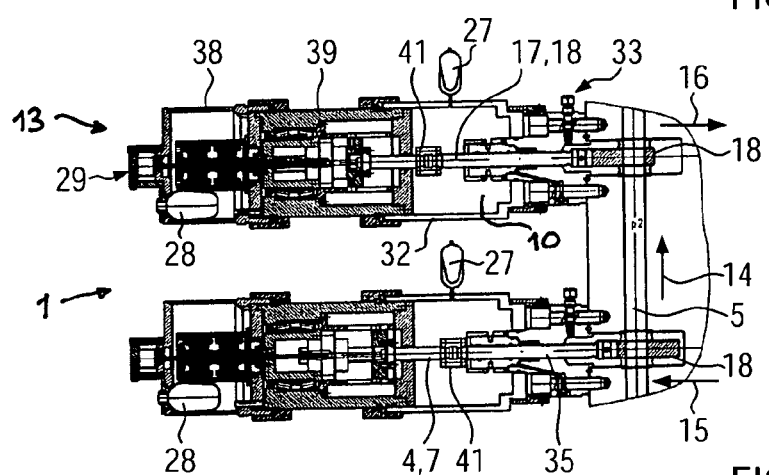
FIG. 5 is a longitudinal section by analogy with FIG. 4 through the two actuating devices in use position.
Figure 6:
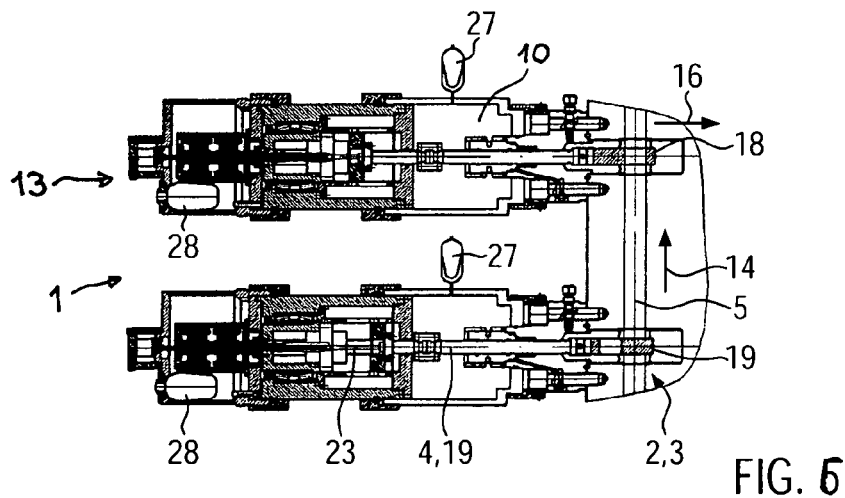
FIG. 6 is a longitudinal section by analogy with FIG. 4 with the other actuating device in non-use position.

FIGS. 4 to 6 show a second embodiment of the invention. In this embodiment the two actuating devices 1 and 13 are arranged one after the other relative to the flow direction 14 of the conveying medium 5 in the conveying line 42. The structure of the actuating device 1 according to FIGS. 4 to 6 corresponds substantially to the actuating devices according to FIGS. 1 to 3. The difference lies substantially only in the reverse displacement direction 16 of an actuating device 13 relative to the displacement direction 15 of the other actuating device, see e.g. FIGS. 4 and 6 in comparison with FIG. 5. This means that the actuating device 13, see FIGS. 4 and 5, displaces the corresponding valve slide 35 from the use position 18, see FIG. 5, to the right side in the plane of the figures, see FIG. 4, into the corresponding non-use position 20. This means that for a displacement between use position and non-use position the corresponding piston 17 and the associated threaded spindle 23 are pushed out, whereas inversely in the actuating device 1 a displacement between use position 18 and non-use position 19, see FIGS. 5 and 6, takes place by inserting or retracting the piston of the corresponding threaded spindle 23. Except for this difference in the displacement direction 15 and 16, respectively, of the two actuating devices 1 and 13, their structure is identical with or comparable to the structure of the actuating devices according to FIGS. 1 to 3.

In the various actuating devices 1 and 13, the valve slide is each time displaced by means of the associated piston 4, 17 and the corresponding threaded spindle 23, respectively, in a controlled manner between the different positions.

In the absence of electrical power supply and with the two valve slides in use position 18, see FIG. 5, the pressure difference between pressure p2 in the conveying medium 5 and p1 in the inner medium in the interior 10 of the corresponding actuating device 1, 13 plays a role. If pressure p2 of the conveying medium 5 is greater than the internal pressure p1, which is substantially identical due to the closely neighboring arrangement of the two actuating devices 1, 13 for both devices, the actuating device 1 closes the valve by pushing the valve slide 35 back into the non-use position 19, as shown in FIG. 6. If, instead of this, the internal pressure p1 is greater than pressure p2 in the conveying medium, the actuating device 13 carries out the closing operation by pushing the valve slide 35 by means of the corresponding piston 17, see FIG. 4.

It is also ensured with this successive arrangement of two actuating devices 1, 13 with different displacement directions 15, 16 for the valve slide between use position and non-use position that in case of power outage the valve is closed and the control device is actuated accordingly.

It should further be noted that the efforts according to the embodiment of FIGS. 4 to 6 with two actuating devices 1 and 13 are relatively great. However, there are applications where already two actuating devices of such a type are arranged on a corresponding conveying line 42, such as for example in the so-called master valve and wing valve.

These are then configured according to the invention with different displacement directions, so that in the absence of electrical power supply and independently of the pressure difference between p1 and p2 it is possible to close the valve and the control device, respectively.

In case the two pressures are again substantially identical, see the above explanation, it is also possible in the second embodiment that a corresponding emergency device is provided in at least one of the two actuating devices 1, 13, see emergency power supply e.g. in the form of a battery, or the like, or external mechanical access to the actuating device.

What is claimed is:

1. An actuating device for displacing a control device for use in oil or gas production systems, comprising:
   a motor-gear unit;
   a thread drive that is configured to be operated by the motor-gear unit and that comprises a threaded spindle and a screw nut, the threaded spindle configured to move in an axial direction to displace the control device between a first non-use position, a use position a second non-use position with the use position between the first and second non-use positions;
   wherein, in the use position, the control device is configured to enable fluid flow with respect thereto, and in the first and second non-use positions, the control device is configured to prevent fluid flow with respect thereto.

2. The actuating device of claim 1, wherein the actuating device comprises at least one pressure compensator.

3. The actuating device of claim 1, wherein a position sensor is assigned at least to the motor-gear unit.

4. The actuating device of claim 1, wherein the actuating device comprises an emergency power supply.

5. The actuating device of claim 1, wherein the actuating device is mechanically displaceable particularly from the outside.

6. The actuating device of claim 1, wherein the actuating device comprises at least one drive module, an adapter module, and a connection module.

7. The actuating device of claim 6, wherein the connection module is particularly detachably fastened from the outside to the control device.

8. The actuating device of claim 6, wherein the connection module comprises a guide bore for a valve slide of the control device, through which guide bore the valve slide is guided up into the adapter module.

9. The actuating device of claim 8, wherein the guide bore comprises an end stop for a slide head of the valve slide, the slide head being substantially positioned on the end stop in the first non-use position.

10. The actuating device of claim 6, wherein the actuating device comprises at least one pressure compensator assigned to the adapter module.

11. The actuating device of claim 6, wherein the drive module comprises a motor module and a gear module.

* * * * *